(12) United States Patent
Bandel et al.

(10) Patent No.: US 11,557,977 B2
(45) Date of Patent: Jan. 17, 2023

(54) UNIVERSAL INPUT ELECTRONIC TRANSFORMER

(71) Applicant: Hubbell Lighting, Inc., Shelton, CT (US)

(72) Inventors: Michael William Bandel, North Aurora, IL (US); Alok Vishambhar Dayal Pandey, Maharashtra (IN); Glenn Donald Garbowicz, Algonquin, IL (US)

(73) Assignee: Hubbell Lighting, Inc., Shelton, CT (US)

( * ) Notice: Subject to any disclaimer, the term of this patent is extended or adjusted under 35 U.S.C. 154(b) by 0 days.

(21) Appl. No.: 16/519,209

(22) Filed: Jul. 23, 2019

(65) Prior Publication Data

US 2019/0348922 A1 Nov. 14, 2019

Related U.S. Application Data

(63) Continuation of application No. 14/664,379, filed on Mar. 20, 2015, now Pat. No. 10,361,637.

(51) Int. Cl.
| | |
|---|---|
| *H02M 5/458* | (2006.01) |
| *H02M 3/335* | (2006.01) |
| *H02M 1/10* | (2006.01) |
| *H02M 7/06* | (2006.01) |
| *H02M 5/45* | (2006.01) |
| *H02M 1/42* | (2007.01) |
| *H02M 3/156* | (2006.01) |
| *H02M 1/00* | (2006.01) |

(52) U.S. Cl.
CPC ......... *H02M 3/33573* (2021.05); *H02M 1/10* (2013.01); *H02M 3/33571* (2021.05); *H02M 5/458* (2013.01); *H02M 7/06* (2013.01); *H02M 1/0006* (2021.05); *H02M 1/007* (2021.05); *H02M 1/0064* (2021.05); *H02M 1/4258* (2013.01); *H02M 3/156* (2013.01); *H02M 5/45* (2013.01); *Y02B 70/10* (2013.01)

(58) Field of Classification Search
CPC .......... H02M 5/458; H02M 5/45; H02M 1/10; H02M 1/4258; H02M 3/337; H02M 7/06; H02M 2001/0006; H02M 2001/0064; H02M 2001/007
See application file for complete search history.

(56) References Cited

U.S. PATENT DOCUMENTS

| | | |
|---|---|---|
| 3,324,377 A | 6/1967 | Mills |
| 3,414,801 A | 12/1968 | Bishop |

(Continued)

OTHER PUBLICATIONS

PCT/US2016/023104 International Search Report and Written Opinion dated Jun. 20, 2016.

*Primary Examiner* — Thienvu V Tran
*Assistant Examiner* — Nusrat Quddus
(74) *Attorney, Agent, or Firm* — Michael Best & Friedrich LLP

(57) ABSTRACT

An electronic transformer including a controller and a dimming control circuit. The controller is configured to control an output voltage. The dimming control circuit is configured to receive a user-input and output a control signal based on the user-input. The controller varies the output voltage based on the control signal. Wherein the output voltage is substantially the same regardless of an amplitude of an input voltage.

12 Claims, 14 Drawing Sheets

(56) References Cited

U.S. PATENT DOCUMENTS

| | | | |
|---|---|---|---|
| 3,448,367 A | 6/1969 | Corey | |
| 3,470,449 A | 9/1969 | Risberg | |
| 4,060,757 A | 11/1977 | McMurray | |
| 4,414,493 A * | 11/1983 | Henrich | H05B 41/3922 315/149 |
| 4,426,564 A | 1/1984 | Steigerwald | |
| 4,471,419 A | 9/1984 | Schneider | |
| 4,709,318 A | 11/1987 | Gephart | |
| 4,717,994 A | 1/1988 | Diaz | |
| 4,719,550 A | 1/1988 | Powell | |
| 5,563,777 A | 10/1996 | Miki et al. | |
| 5,583,402 A * | 12/1996 | Moisin | H05B 41/3927 315/307 |
| 5,661,645 A | 8/1997 | Hochstein | |
| 5,747,942 A * | 5/1998 | Ranganath | H05B 41/282 315/224 |
| 5,925,990 A | 7/1999 | Crouse et al. | |
| 6,359,391 B1 * | 3/2002 | Li | H05B 41/2855 315/119 |
| 6,396,715 B1 | 5/2002 | Zhang | |
| 6,963,175 B2 * | 11/2005 | Archenhold | H05B 33/0818 315/246 |
| 7,109,438 B2 | 9/2006 | Ishii | |
| 7,411,360 B2 * | 8/2008 | Henry | H05B 41/382 315/307 |
| 7,414,371 B1 * | 8/2008 | Choi | H05B 41/3927 315/291 |
| 7,525,255 B2 * | 4/2009 | Jin | H05B 41/3927 315/174 |
| 7,920,392 B2 | 4/2011 | Schneider | |
| 8,030,853 B1 | 10/2011 | Wong et al. | |
| 8,076,920 B1 * | 12/2011 | Melanson | H02M 3/005 323/299 |
| 8,305,779 B2 | 11/2012 | Lu | |
| 8,503,204 B2 * | 8/2013 | Carletti | H02M 1/42 363/78 |
| 9,013,896 B2 * | 4/2015 | Thomas | H02M 3/33569 363/16 |
| 9,240,726 B1 * | 1/2016 | Xiong | H02M 3/33507 |
| 9,246,391 B2 * | 1/2016 | Berghegger | H02M 3/33507 |
| 9,300,206 B2 * | 3/2016 | Ye | H02M 1/4225 |
| 9,313,850 B2 * | 4/2016 | Zhao | H05B 33/0845 |
| 9,331,566 B1 * | 5/2016 | Banayan | H02J 3/1828 |
| 9,538,600 B2 * | 1/2017 | Chitta | H02M 1/08 |
| 9,572,207 B2 * | 2/2017 | Lau | H02M 3/155 |
| 10,098,196 B2 * | 10/2018 | Kober | H05B 33/0815 |
| 10,452,085 B2 * | 10/2019 | Gerding | G01F 23/00 |
| 2001/0054887 A1 * | 12/2001 | Baretich | H02M 5/293 323/284 |
| 2002/0071299 A1 | 6/2002 | Franck | |
| 2002/0149892 A1 | 10/2002 | Williams | |
| 2002/0190696 A1 * | 12/2002 | Darshan | H02M 1/4258 323/207 |
| 2004/0090800 A1 | 5/2004 | Moisin | |
| 2005/0029966 A1 | 2/2005 | Bounocunto | |
| 2007/0279019 A1 | 12/2007 | Wilson | |
| 2007/0279368 A1 * | 12/2007 | Shefter | G02F 1/133615 345/102 |
| 2008/0136343 A1 * | 6/2008 | Yu | H05B 41/3925 315/219 |
| 2008/0224633 A1 | 9/2008 | Melanson et al. | |
| 2009/0196072 A1 | 8/2009 | Ye | |
| 2009/0237968 A1 * | 9/2009 | Dooley | H02M 7/4807 363/97 |
| 2009/0273738 A1 * | 11/2009 | Fukumoto | H05B 41/2827 349/70 |
| 2010/0238689 A1 * | 9/2010 | Fei | H02M 3/33523 363/21.16 |
| 2010/0289420 A1 * | 11/2010 | Arai | H05B 41/3927 315/224 |
| 2011/0155703 A1 | 6/2011 | Winn | |
| 2011/0241557 A1 * | 10/2011 | Grotkowski | H05B 33/0824 315/246 |
| 2011/0266966 A1 | 11/2011 | Veeken | |
| 2012/0056551 A1 * | 3/2012 | Zhu | H02M 1/4258 315/232 |
| 2012/0286679 A1 * | 11/2012 | Liu | H05B 33/0827 315/193 |
| 2013/0033910 A1 * | 2/2013 | Carletti | H02M 3/155 363/131 |
| 2013/0049622 A1 | 2/2013 | Angeles | |
| 2013/0051090 A1 * | 2/2013 | Xie | H02M 1/4258 363/21.17 |
| 2013/0127538 A1 * | 5/2013 | Murakami | H03F 1/523 330/277 |
| 2013/0271021 A1 | 10/2013 | Elferich | |
| 2014/0021180 A1 | 1/2014 | Vogel | |
| 2014/0376287 A1 | 12/2014 | Narimani | |
| 2015/0036403 A1 | 2/2015 | Yu | |
| 2015/0188412 A1 * | 7/2015 | Imanaka | H05B 45/385 327/140 |
| 2016/0190941 A1 * | 6/2016 | Kuang | H05B 45/31 363/21.01 |

* cited by examiner

UNIVERSAL INPUT ELECTRONIC TRANSFORMER

RELATED APPLICATIONS

This application claims priority to U.S. patent application Ser. No. 14/664,379, filed on Mar. 20, 2015, the entire contents of which are incorporated herein by reference.

FIELD

The present application generally relates to transformers, more specifically, electronic transformers used for providing power to light-emitting diodes (LEDs).

Transformers are commonly used in alternating-current (AC) voltage distribution systems. Traditionally, transformers are electromagnetic devices for use at low AC line frequencies. Electronic transformers are a variation of electromagnetic transformers. Both electromagnetic transformers and electronic transformers are commonly used in the lighting industry. While the electromagnetic transformer remains a ubiquitous industry standard for use in stepping up, stepping down, and/or isolating electrical distribution, electromagnetic transformers have severe limitations of size, weight, and technological characteristics.

SUMMARY

To overcome some of these limitations, a device consistent with one or more of the exemplary embodiments disclosed herein provides an electronic transformer including a controller and a dimming control circuit. The controller is configured to control an output voltage. The dimming control circuit is configured to receive a user-input and output a control signal based on the user-input. The controller varies the output voltage based on the control signal. Wherein the output voltage is substantially the same regardless of an amplitude of an input voltage.

Another exemplary embodiment of the disclosure provides a method of transforming an input voltage. The method includes receiving the input voltage outputting an output voltage; receiving a user-input; outputting a control signal based on the user-input; and varying the output voltage based on the control signal. Wherein the output voltage is substantially the same regardless of an amplitude of the input voltage.

Other aspects of exemplary embodiments of the devices and methods disclosed will become apparent by consideration of the detailed description and accompanying drawings.

DETAILED DESCRIPTION

Before any embodiments of the present application are explained in detail, it is to be understood that the devices and methods disclosed herein are not limited in their application to the details of construction and the arrangement of components set forth in the following description or illustrated in the following drawings. The exemplary devices and methods disclosed are capable of other embodiments and of being practiced or of being carried out in various ways.

Figure 1:
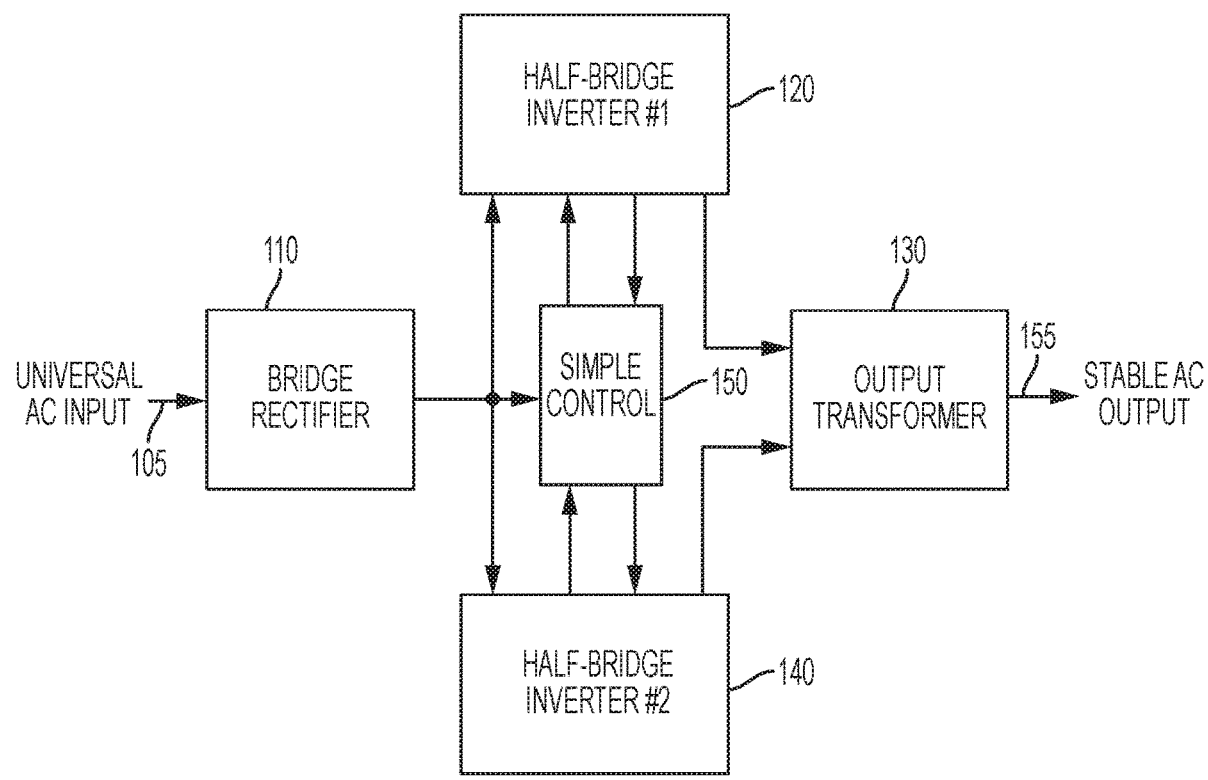
FIG. 1 is a block diagram illustrating a universal input electronic transformer according to one embodiment of the present application.

FIG. 1 is a block diagram illustrating a simple universal input electronic transformer (SUIET) 100 according to one embodiment of the present application. The SUIET 100 includes an input 105, a rectifier 110, a first inverter 120, an output transformer 130, a second inverter 140, a controller, or control, 150, and an output 155. The input 105 receives an input voltage. In some embodiments, the input voltage is approximately 120 VAC having a 50 Hz or 60 Hz frequency or approximately 277 VAC having a 50 Hz or 60 Hz frequency. In other embodiments, the input voltage is within a range of approximately 90 VAC to approximately 305 VAC.

Figure 2:
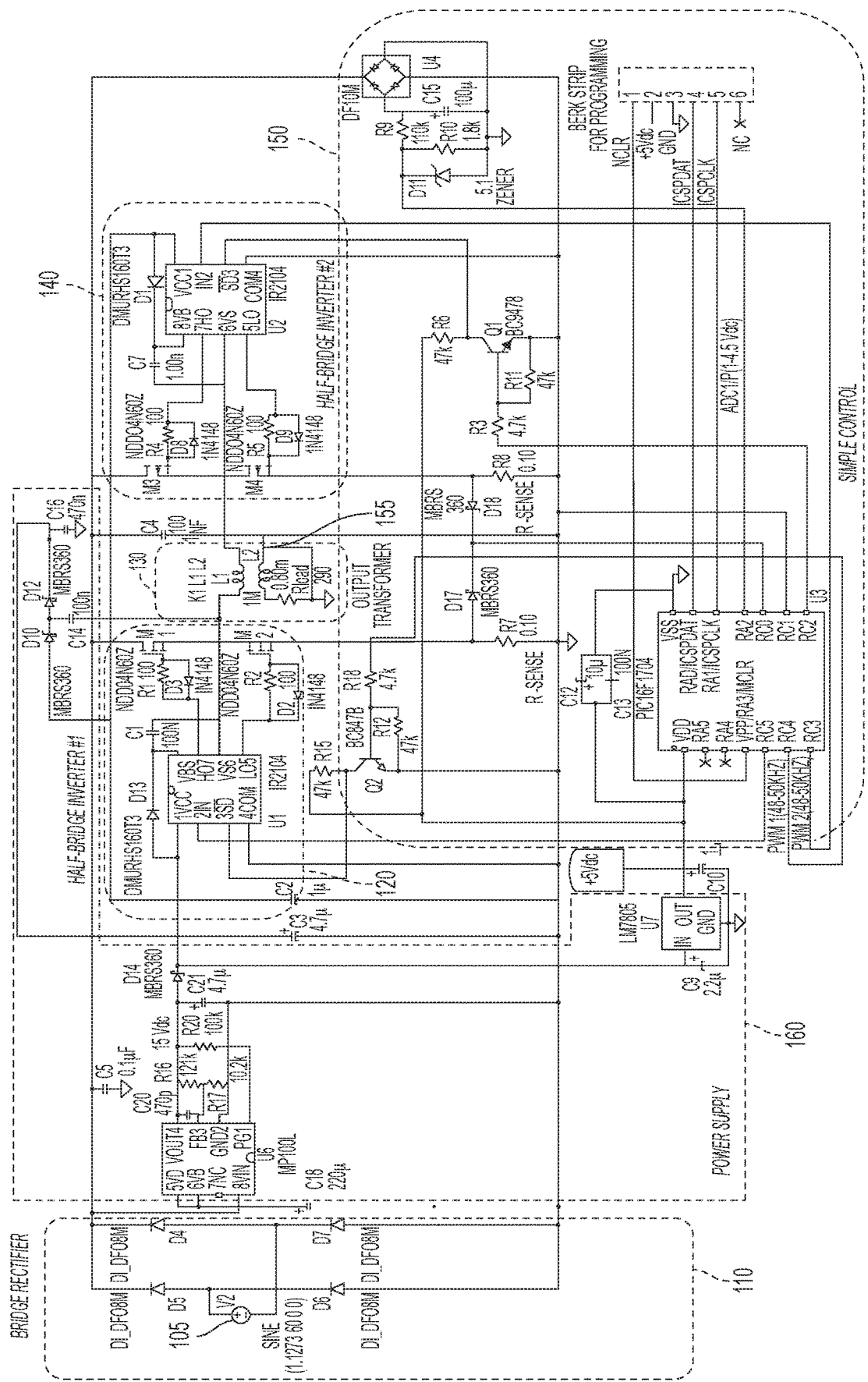
FIG. 2 is a circuit diagram illustrating the universal input electronic transformer of FIG. 1.

FIG. 2 is a circuit diagram illustrating the components of the SUIET 100. The rectifier 110 receives the input voltage at the input 105, rectifies the input voltage, and outputs a rectified voltage (e.g., a positively pulsating, direct-current (DC) half sine wave voltage). In the illustrated embodiment, the rectifier 110 is a bridge rectifier including four diodes D1-D4. In other embodiments, the rectifier 110 includes only two diodes. In some embodiments, the rectifier 110 further includes a filter capacitor configured and minimized to maintain a half sine wave, 120 Hz envelope of rectified voltage. The rectified voltage is output to the first inverter 120, the second inverter 140, and the controller 150.

In the illustrated embodiment of FIG. 2, the rectified voltage is also received by a power supply 160. In such an embodiment, the power supply 160 supplies a nominal DC voltage (e.g., 5V DC, 10V DC, 15V DC, etc.) to the controller 150 and/or other components or modules of the SUIET 100 (e.g., a first drive U1 and a second driver U2 of the first inverter 120 and the second inverter 140 respectively). The power supply 160 is also configured to supply lower voltages to operate circuits and components within the controller 150 or SUIET 100. In some embodiments, the power supply 160 and the rectifier 110 are a single module that receives the input voltage and outputs the rectified voltage and the nominal DC voltage. In other embodiments, the controller 150 receives power (e.g., in the form of the rectified voltage) directly from the rectifier 110.

The first inverter 120 and the second inverter 140, or first and second converters, switch the rectified voltage (i.e., invert the rectified DC-voltage to a switched AC-voltage). In the illustrated embodiment, the first inverter 120 and the second inverter 140 are half-bridge inverters, the first inverter 120 including switches M1, M2 and the first driver U1 and the second inverter 140 including switches M3, M4 and the second driver U2. In some embodiments, switches M1-M4 are semiconductors, such as but not limited to, transistors, field-effect transistors (FETs), bipolar junction transistors (BJT), junction field-effect transistor (JFET), metal-oxide-semiconductor field-effect transistors (MOSFETs), insulated-gate bipolar transistors (IGBTs), and insulated-gate field-effect transistors (IGFETs). The first and second drivers U1, U2 receive control signals (e.g., a high-voltage signal [5V DC] or a low-voltage signal [0V DC]) and selectively turn the switches M1-M4 on and off based on received control signals. In operation, when M1 is turned on, M2 must be turned off, and vice-versa. Similarly, when M3 is turned on, M4 must be turned off, and vice-versa. For example, but not limited to, if the first driver U1 receives a high-voltage signal, first driver U1 turns switch M1 on and switch M2 off. If the first driver U1 receives a low-voltage signal, first driver U1 turns switch M1 off and switch M2 on.

The controller 150 outputs the control signals to the first and second drivers U1, U2 for selectively controlling the switches M1-M4. The outputted control signals are based on the received rectified voltage. The controller 150 includes a plurality of electrical and electronic components that provide power, operational control, and protection to the components and modules within the controller 150. For example, the controller 150 includes, among other things, a processing unit (e.g., a microprocessor, a microcontroller, or another suitable programmable device), a memory, input units and output units. In some embodiments, the controller 150 is implemented partially or entirely on a semiconductor (e.g., a field-programmable gate array ["FPGA"] semiconductor) chip, such as a chip developed through a register transfer level ("RTL") design process.

The memory includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit is connected to the memory and executes software instructions that are capable of being stored in a RAM of the memory (e.g., during execution), a ROM of the memory (e.g., on a generally permanent basis), or another non-transitory computer readable medium such as another memory or a disc. Software included in the implementation of the SUIET 100 can be stored in the memory of the controller 150. The software includes, for example, firmware, one or more applications, program data, filters, rules, one or more program modules, and other executable instructions. The controller 150 is configured to retrieve from memory and execute, among other things, instructions related to the control processes and methods described herein. In other constructions, the controller 150 includes additional, fewer, or different components.

The switched voltage, from the first inverter 120 and the second inverter 140, is received by the output transformer 130. The output transformer 130 includes a primary coil L1 and a secondary coil L2. The primary coil L1 receives the inverted voltage. Upon receiving the switched voltage, the primary coil L1 electromagnetically induces a switched high frequency (e.g., 50 KHz) output voltage to the secondary coil L2. The output voltage is then output from the output 155. The output voltage is substantially the same regardless of the fixed input voltage (e.g., 120 VAC RMS or 277 VAC RMS). For example, the output voltage is approximately 106 VAC RMS at 120 VAC RMS input and 133 VAC RMS at 277 VAC RMS input; or, approximately 12 VAC RMS at the two input voltages of merit (e.g., 120 VAC RMS or 277 VAC RMS); or, approximately 24 VAC RMS at the two input voltages of merit (e.g., 120 VAC RMS or 277 VAC RMS).

In one example of operation, an input voltage of either 120 VAC RMS or 277 VAC RMS is received at the input 105. The input voltage is rectified by the rectifier 110 and output to the first inverter 120, the second inverter 140, and the controller 150. If the input voltage is 120 VAC RMS, the controller 150 outputs control signals to the first inverter 120 and the second inverter 140 to selectively output switched voltages to the output transformer 130. If the input voltage is 277 VAC RMS, the controller 150 outputs control signals to only the first inverter 120 to selectively output a switched voltage to the output transformer 130. The output transformer 130 then outputs a transformed voltage that is approximately the same (e.g., approximately 106 VAC RMS to approximately 133 VAC RMS; or approximately 12 VAC RMS to approximately 24 VAC RMS) regardless of the input voltage being 120 VAC RMS or 277 VAC RMS.

Figure 3:
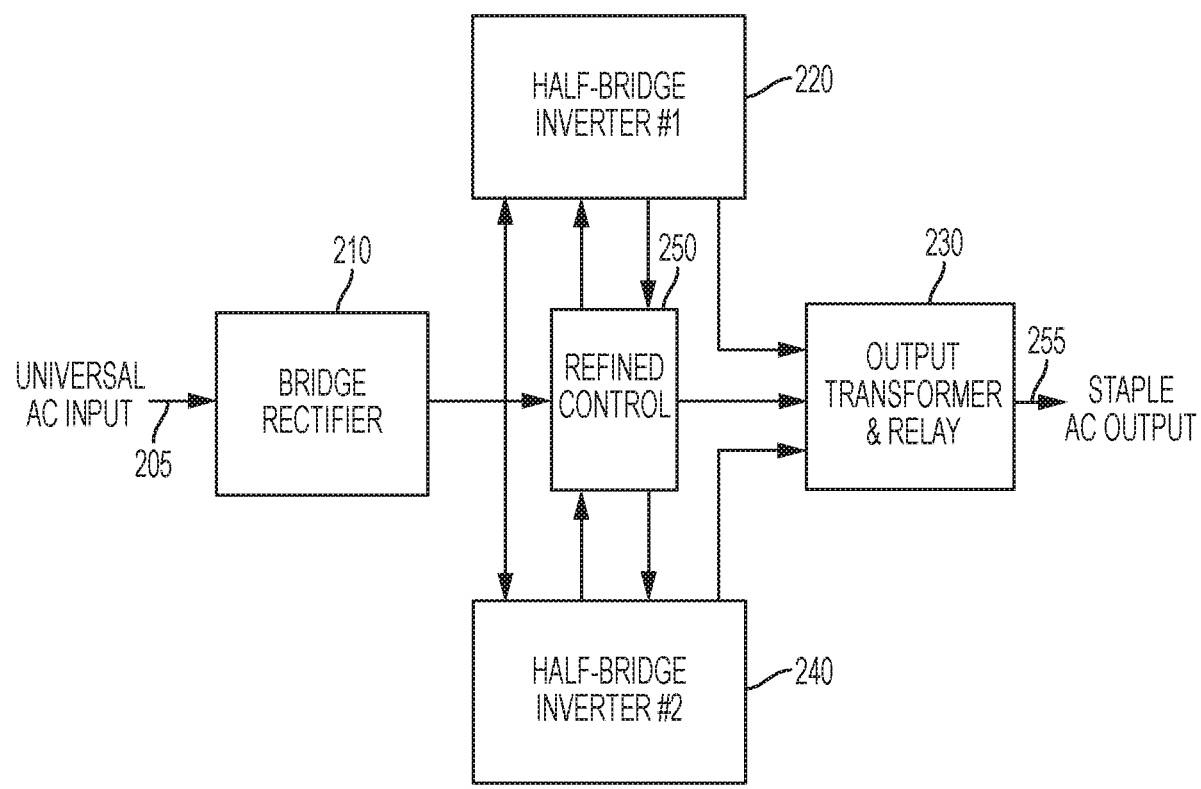
FIG. 3 is a block diagram illustrating a universal input electronic transformer according to another embodiment of the present application.

FIG. 3 is a block diagram illustrating a refined universal input electronic transformer (RUIET) 200 according to another embodiment of the present application. The RUIET 200 includes an input 205, a rectifier 210, a first inverter 220, an output transformer & relay 230, a second inverter 240, a refined control, or controller 250, and an output 255. The input 205 receives the input voltage (e.g., 120 VAC RMS or 277 VAC RMS).

Figure 4A:
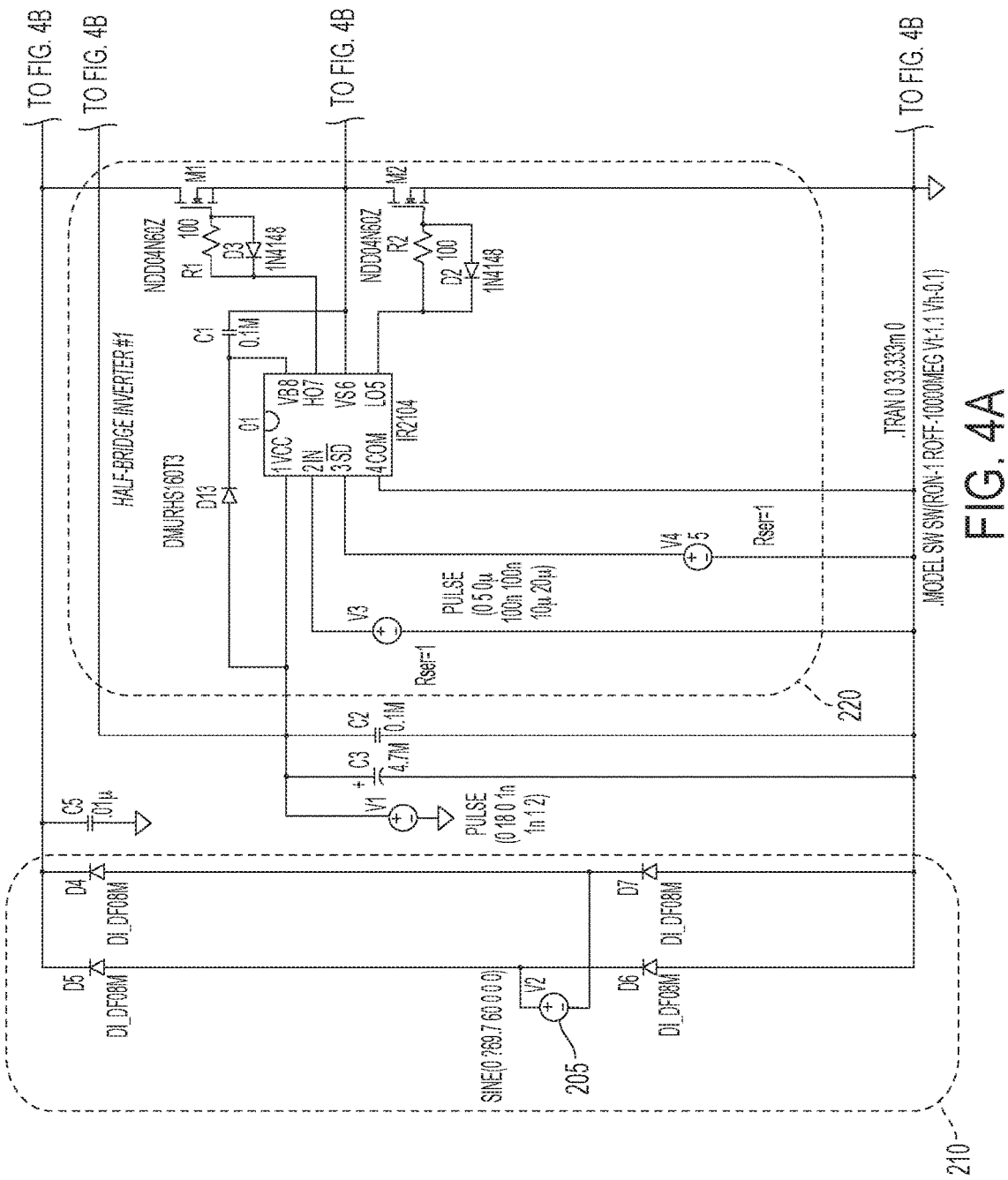
FIGS. 4A and 4B is a circuit diagram illustrating the universal input electronic transformer of FIG. 3.
Figure 4B:
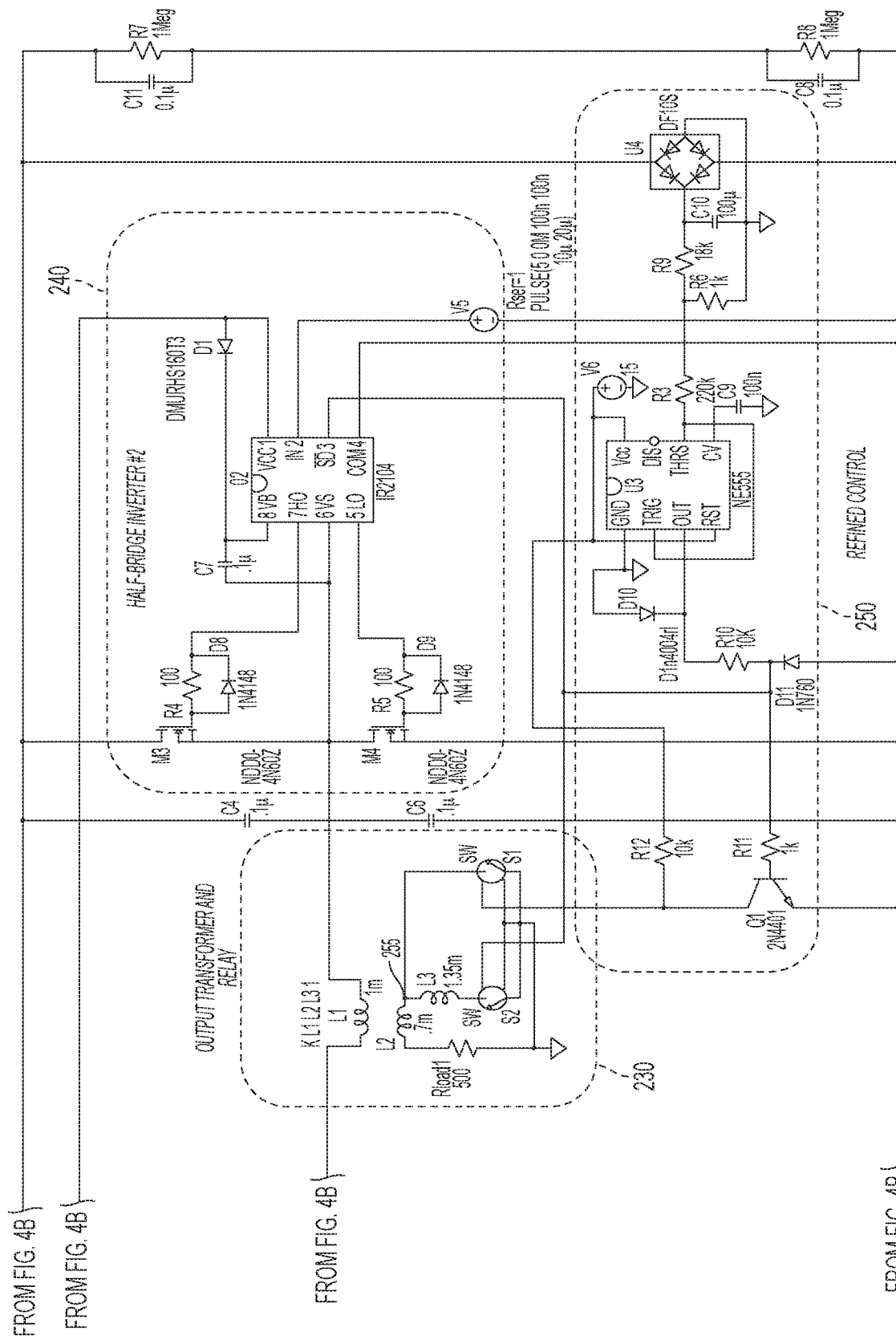

FIGS. 4A and 4B is a circuit diagram illustrating the components of the RUIET 200. In some embodiments, the rectifier 210 is substantially similar to the rectifier 110. The rectifier 210 receives the input voltage from the input 205 and outputs a rectified voltage to the first inverter 220, the second inverter 240, and the controller 250.

The first inverter 220 and the second inverter 240 switch the rectified voltage (i.e., invert the rectified DC-voltage to an inverted AC-voltage). In some embodiments, the first inverter 220 and the second inverter 240 are substantially similar to the first inverter 120 and the second inverter 140. In the illustrated embodiment, the first inverter 220 includes switches M1, M2 and a first driver U1, while the second inverter 240 includes switches M3, M4 and a second driver U2. The first and second drivers U1, U2 receive control signals and selectively turn the switches M1-M4 on and off based on received control signals.

The output transformer & relay 230 receives the switched voltage from the first inverter 220 and the second inverter 240. The output transformer & relay 230 includes a primary coil L1, a secondary coil (L2 or both L2 and L3), a first relay switch S1, and a second relay switch S2. The primary coil L1 receives the switched voltage. Upon receiving the switched voltage, the primary coil L1 electromagnetically induces a switched high frequency (e.g., 50 KHz) output voltage to the secondary coil (L2 or both L2 and L3). The first relay switch S1 and second relay switch S2 are configured to switch the turns ratios of the secondary coil, such that the secondary coil is equivalent to either L2 or both L2 and L3. Switching the turns ratio of the secondary coil produces a substantially similar output voltage regardless of the input voltage. In some embodiments, the output voltage of the RUIET 200 is more constant that the than the previously disclosed SUIET 100 of FIG. 1.

The first relay switch S1 and the second relay switch S2 are controlled by the controller 250. In the illustrated embodiment, the controller 250 is a timing circuit, although other controls may be used. The controller 250 controls the first relay switch S1 and the second relay switch S2 according to the received rectified voltage, and thus the input voltage. If the input voltage is 120 VAC RMS, the controller 250 turns relay switch S2 on and relay switch S1 off, therefore the secondary coil equals L2 and L3 together. If the input voltage is 277 VAC RMS, the controller 250 turns relay switch S2 off and relay switch S1 on, therefore the secondary coil equals L2 only.

The output voltage is then output from the output 255. The output voltage is substantially the same regardless of the input voltage (e.g., 120 VAC RMS or 277 VAC RMS). For example, the output voltage is 120 VAC RMS regardless of the input being 120 VAC RMS or 277 VAC RMS. In another embodiment, the output can be 12 VAC RMS or 24 VAC RMS, depending on the turns ratios and regardless of the input voltage being approximately 120 VAC RMS or approximately 277 VAC RMS.

Figure 5:
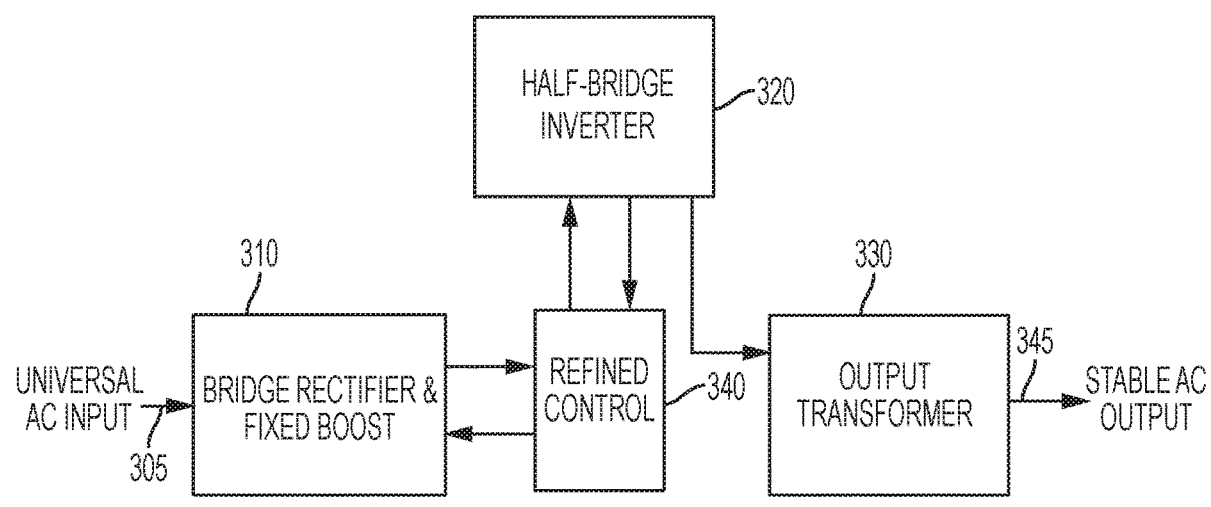
FIG. 5 is a block diagram illustrating a universal input electronic transformer according to another embodiment of the present application.

FIG. 5 is a block diagram illustrating an alternate refined universal input electronic transformer (aRUIET) 300 according to another embodiment of the present application. The aRUIET 300 includes an input 305, a rectifier & fixed boost 310, a first inverter 320, an output transformer 330, a refined control, or controller 340, and an output 345. The input 305 receives the input voltage (e.g., 120 VAC RMS or 277 VAC RMS).

Figure 6A:
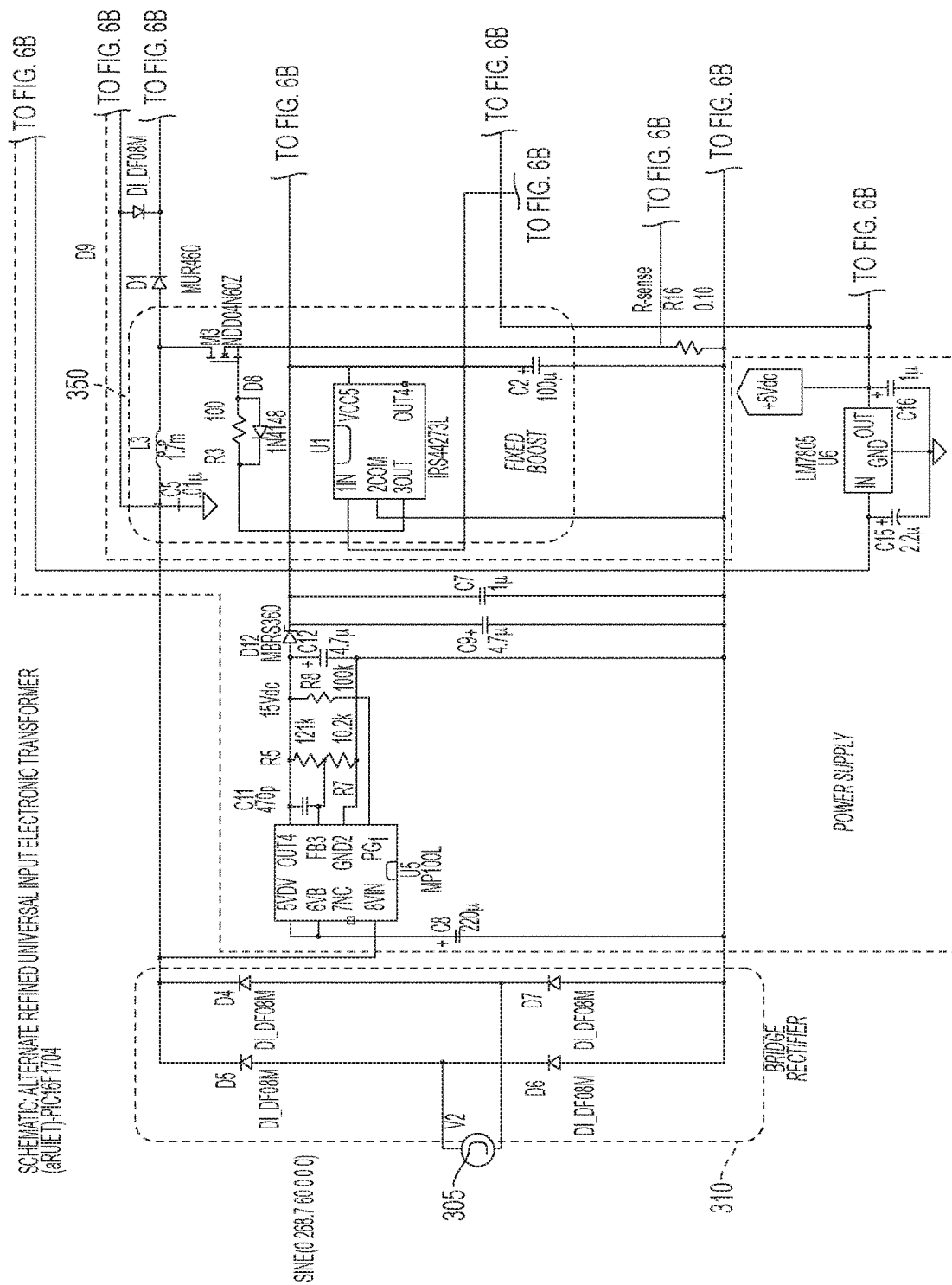
FIGS. 6A and 6B is a circuit diagram illustrating the universal input electronic transformer of FIG. 5.
Figure 6B:
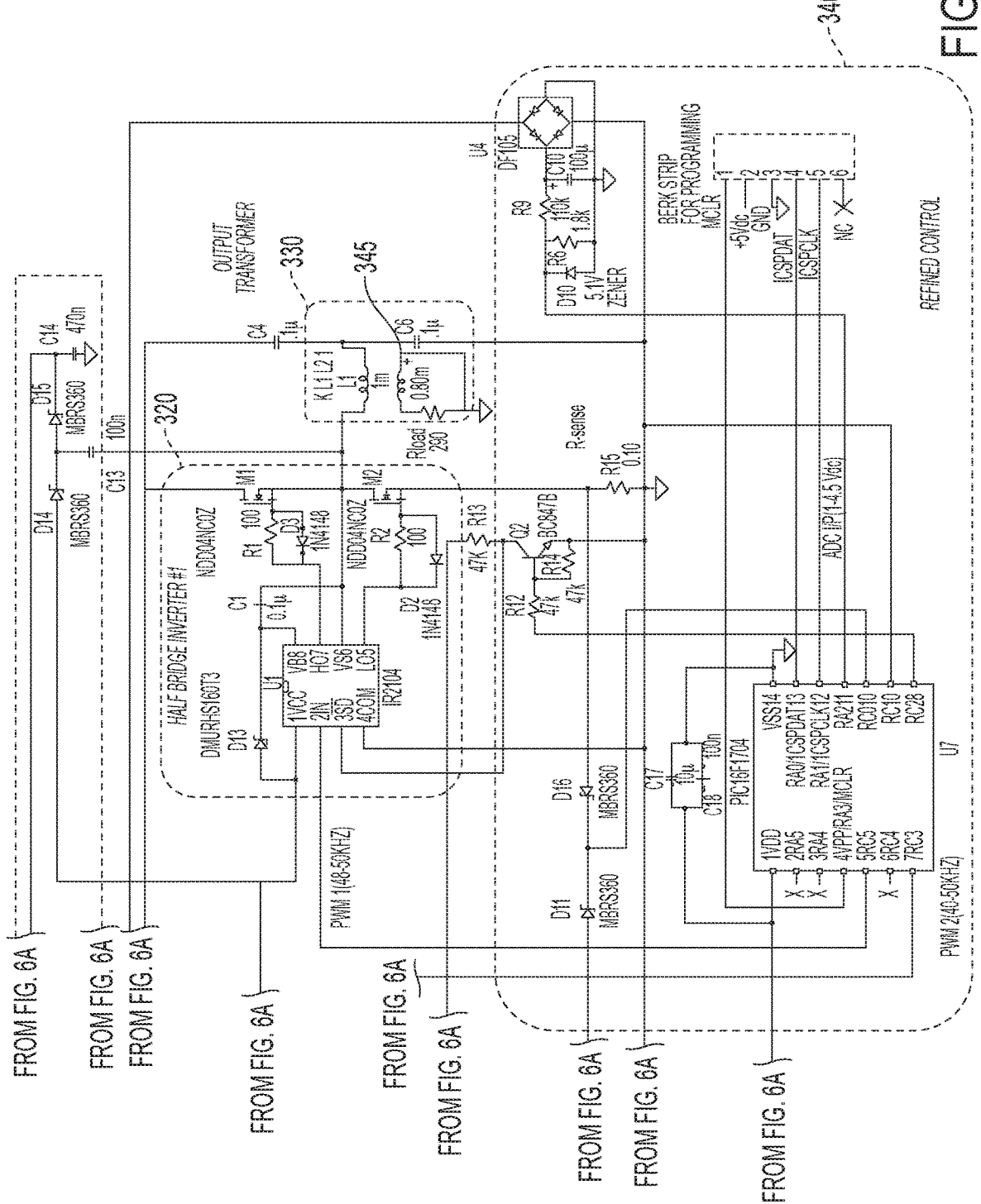

FIGS. 6A and 6B is a circuit diagram illustrating the components of the aRUIET 300. The rectifier 310 receives the input voltage from the input 305, rectifies the input voltage, and outputs a rectified voltage (e.g., a positively-pulsating, direct-current (DC) half sine wave voltage). In some embodiments, the rectifier 310 is substantially the same as rectifier 110 of FIG. 2.

In the illustrated embodiment, the rectifier & fixed boost 310 includes a bridge rectifier (e.g., diodes D1-D4) and a fixed boost, or booster circuit, 350. In such an embodiment, the fixed boost 350 receives the rectified voltage. Depending on the amplitude of the rectified voltage, the fixed boost 350 may further boost (e.g., increase the amplitude) of the rectified voltage.

In other embodiments, the rectifier & fixed boost 310 includes the bridge rectifier (e.g., diodes D1-D4), the fixed boost 350, and a power supply 360. In such an embodiment, the power supply 360 may be substantially similar to the power supply 160 of FIG. 2. In such an embodiment, the fixed boost 350 and the power supply 360 receives the rectified voltage. The fixed boost 350 outputs the rectified voltage or a boosted voltage (depending on the amplitude of the rectified voltage) while the power supply 360 outputs the nominal DC voltage (e.g., 5V DC, 10V DC, 15V DC, etc.). In other embodiments, the bridge rectifier includes only two diodes. In some embodiments, the rectifier & fixed boost 310 further includes a smoothing capacitor configured to smooth out the rectified voltage.

The controller 340 receives the rectified voltage. In some embodiments, controller 340 is substantially similar to controller 150 of FIGS. 1 and 2. Depending on the amplitude of the rectified voltage, the controller 340 controls the fixed boost 350 to either output the boosted voltage or the non-boosted rectified voltage. For example, but not limited to, if the rectified voltage has an amplitude of approximately 170V peak (e.g., the peak of a 120 VAC RMS sine wave), the controller 340 will control the fixed boost 350 to boost the rectified voltage to approximately 392V peak (e.g., the peak of a 277 VAC RMS sine wave). If the rectified voltage has an amplitude of approximately 277V, the controller 340 will control the fixed boost 350 not to boost the rectified voltage.

The controller 340 further controls the first inverter 320 in a similar fashion as the embodiment illustrated in FIGS. 1 and 2. In the present embodiment, only one half-bridge inverter is necessary. This is because the fixed boost 350 provides a substantially similar rectified voltage to the first inverter 320, regardless of the amplitude of the input voltage.

The first inverter 320 switches the rectified voltage (e.g., boosted rectified voltage or non-boosted rectified voltage) and outputs a switched voltage to the output transformer 330. In some embodiments, the first inverter 320 is substantially similar to the first inverter 120 of the embodiment illustrated in FIGS. 1 and 2.

The output transformer 330 receives the switched voltage and outputs an outputted voltage in a similar fashion as the embodiment of FIGS. 1 and 2. In some embodiments, the output transformer 330 is substantially similar to the output transformer 130 of the embodiment illustrated in FIGS. 1 and 2. The output voltage is then output via the output 345. Similar to the embodiments illustrated in FIGS. 1-4, the output voltage of the aRUIET 300 is substantially similar regardless of the amplitude of the input voltage.

Figure 7:
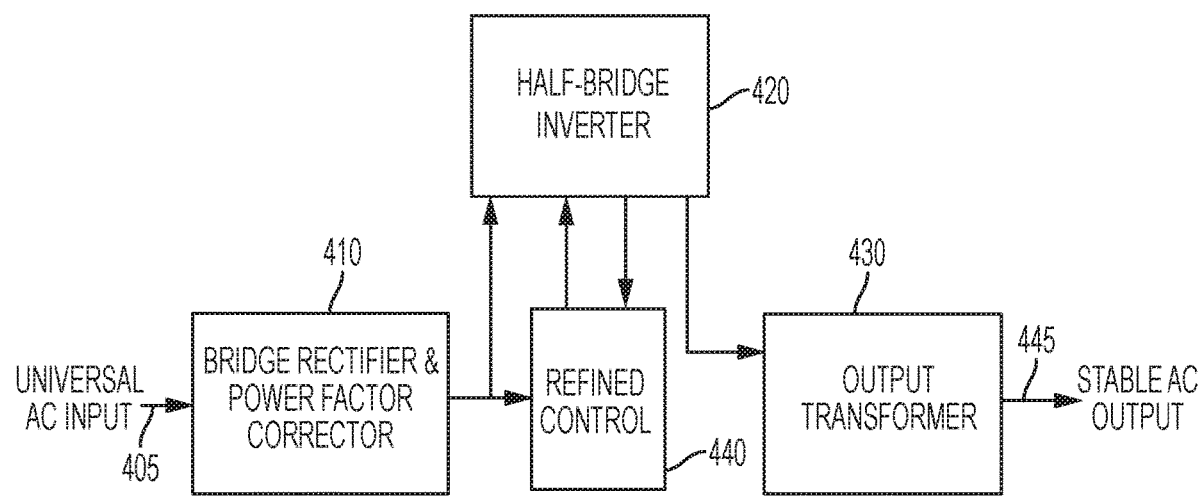
FIG. 7 is a block diagram illustrating a universal input electronic transformer according to another embodiment of the present application.

FIG. 7 is a block diagram illustrating a precise universal input electronic transformer (PUIET) 400 according to another embodiment of the present application. The PUIET 400 includes an input 405, a rectifier & power factor corrector 410, a first inverter 420, an output transformer 430, a refined control, or controller 440, and an output 445. The input 405 receives the input voltage (e.g., 120 VAC RMS or 277 VAC RMS).

Figure 8:
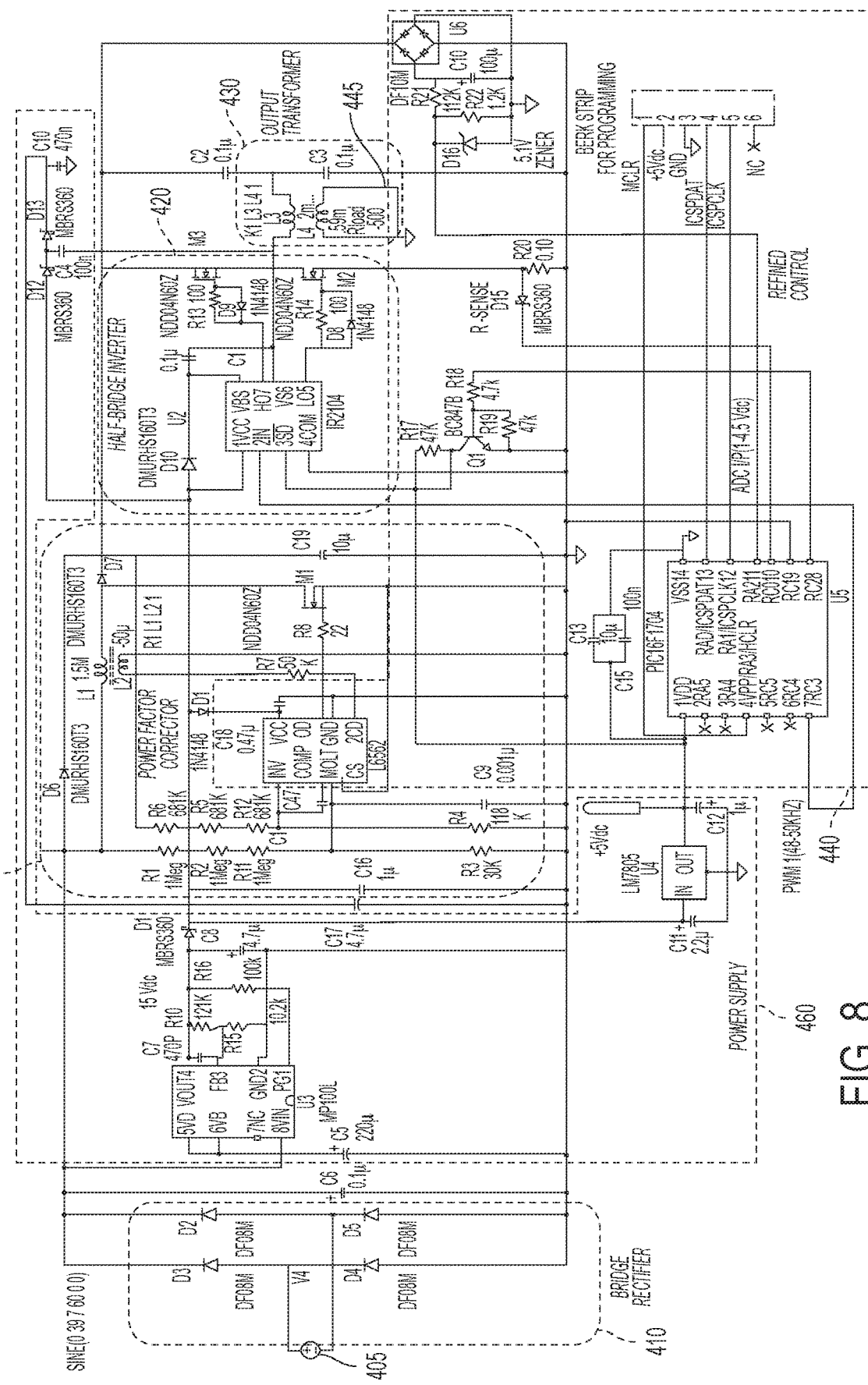
FIG. 8 is a circuit diagram illustrating the universal input electronic transformer of FIG. 7.

FIG. 8 is a circuit diagram illustrating the components of the PUIET 400. In the illustrated embodiment, the rectifier & power factor corrector 410 includes a bridge rectifier (e.g., diodes D1-D4) and a power factor corrector 450. The bridge rectifier rectifies the input voltage received at the input 405. The power factor corrector 410 receives the rectified voltage and outputs a substantially constant DC voltage, regardless of the amplitude of the input voltage. In the illustrated embodiment, the power factor corrector 450 includes a primary coil L1 and a secondary coil L2. In one example of operation, a voltage is expressed across the primary coil L1 when switch M1 is turned on, thus storing energy in the magnetic field of the primary coil L1. Consequently, when switch M1 is turned off, the energy stored in the primary coil L1 is released into a storage capacitor C19, through rectifier D7. The voltage across the primary coil L1 reverses polarity such that it is effectively in series with the input voltage, thus providing a boosted voltage. Once all of the energy from stored in the primary coil L1 is released, the secondary coil L2 provides a signal to the controller 440. The operation is equivalent to a high-frequency switching process that outputs a substantially direct-current output at capacitor C19, that is then output to the half-bridge inverter 420.

In other embodiments, the bridge rectifier includes only two diodes. In other embodiments, the rectifier & power factor corrector 410 includes the bridge rectifier (e.g., diodes D1-D4), the power factor corrector 450, and a power supply 460. In such an embodiment, the power supply 460 may be substantially similar to the power supply 160 of FIG. 2. In such an embodiment, the power supply 460 may supply a nominal DC voltage (e.g., 5V DC, 10V DC, 15V DC, etc.) to the controller 440, for powering the controller 440.

The substantially constant DC voltage, output from the power factor corrector 450, is received by the first inverter 420 and the controller 440. The controller 440 controls the first inverter 420 in a similar fashion as the embodiment illustrated in FIGS. 5 and 6. The first inverter 420 switches the substantially constant DC voltage and outputs a switched voltage to the output transformer 430.

The output transformer 430 receives the switched voltage and outputs an output voltage in a similar fashion as the embodiment of FIGS. 1 and 2. In some embodiments, the output transformer 430 is substantially similar to the output transformer 130 of the embodiment illustrated in FIGS. 1 and 2. The output voltage is then output via the output 445. Similar to the embodiments illustrated in FIGS. 1-6, the output voltage of the PUIET 400 is substantially similar regardless of the amplitude of the input voltage across the entire range of input voltages from 120 VAC RMS through 305 VAC RMS in, as well as all voltages in-between.

Figure 9:
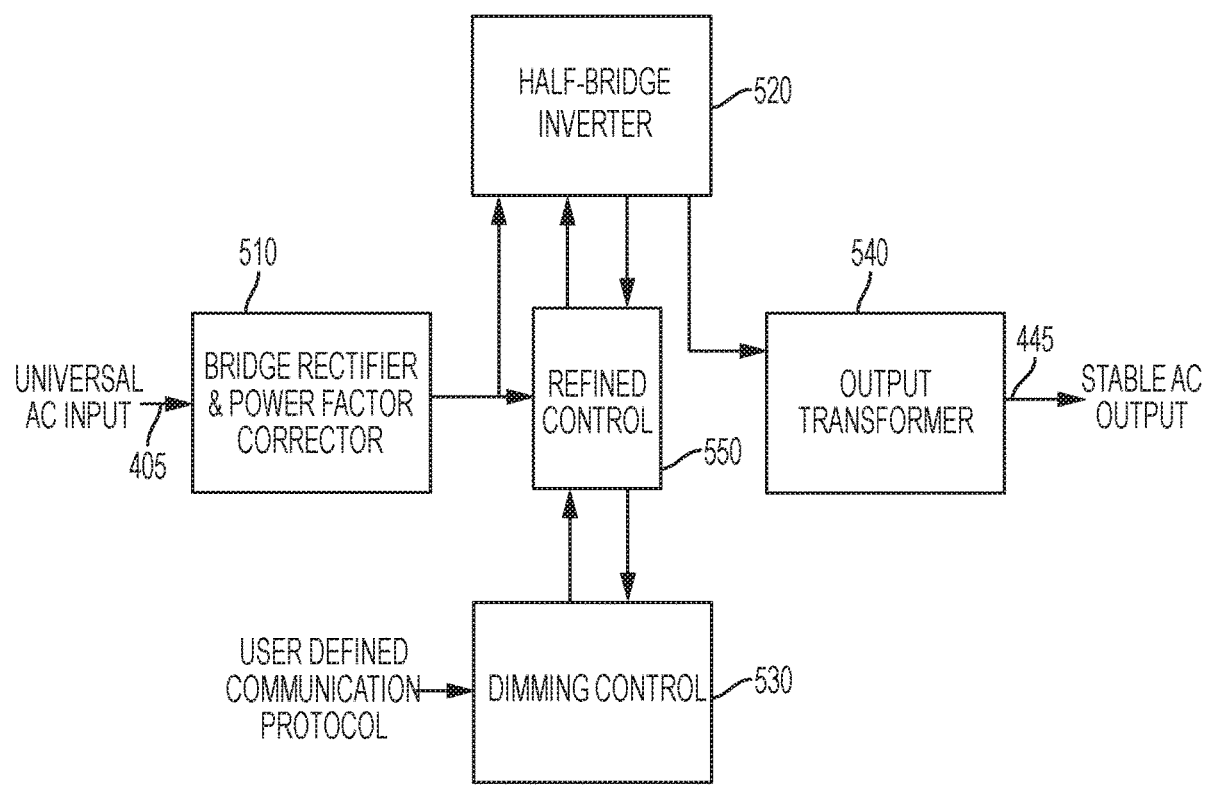
FIG. 9 is a block diagram illustrating a universal input electronic transformer according to another embodiment of the present application.

FIG. 9 is a block diagram illustrating dimmable universal input electronic transformer (DUIET) 500 according to another embodiment of the present application. The DUIET 500 includes an input 505, a rectifier & power factor corrector 510, a first inverter 520, a dimming control, or dimming control circuit, 530, an output transformer 540, a refined control, or controller 550, and an output 555. In some embodiments, the DUIET 500 is substantially similar to the embodiment illustrated in FIGS. 7 and 8, but further includes the dimming control 530.

Figure 10A:
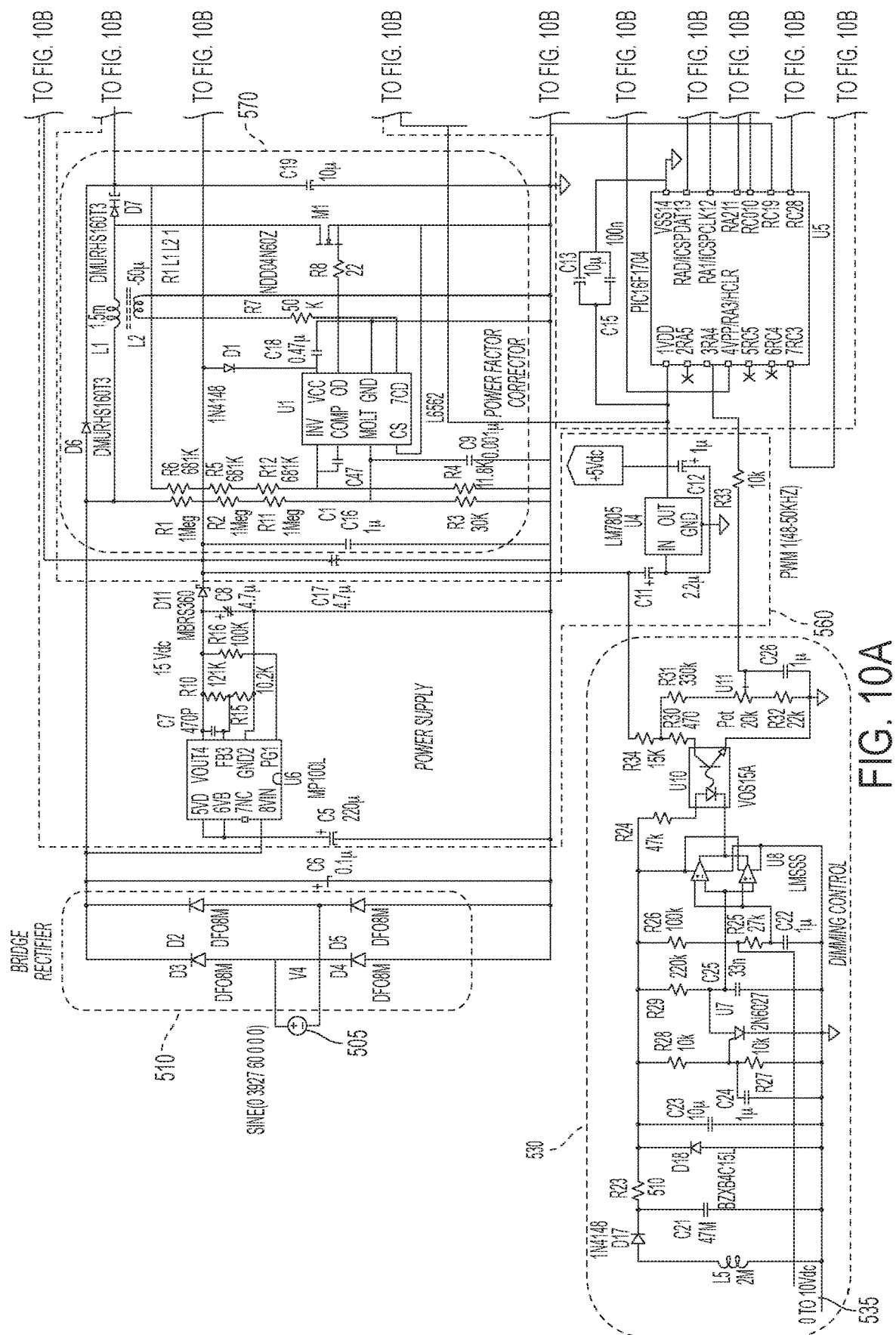
FIGS. 10A and 10B is a circuit diagram illustrating the universal input electronic transformer of FIG. 9.
Figure 10B:
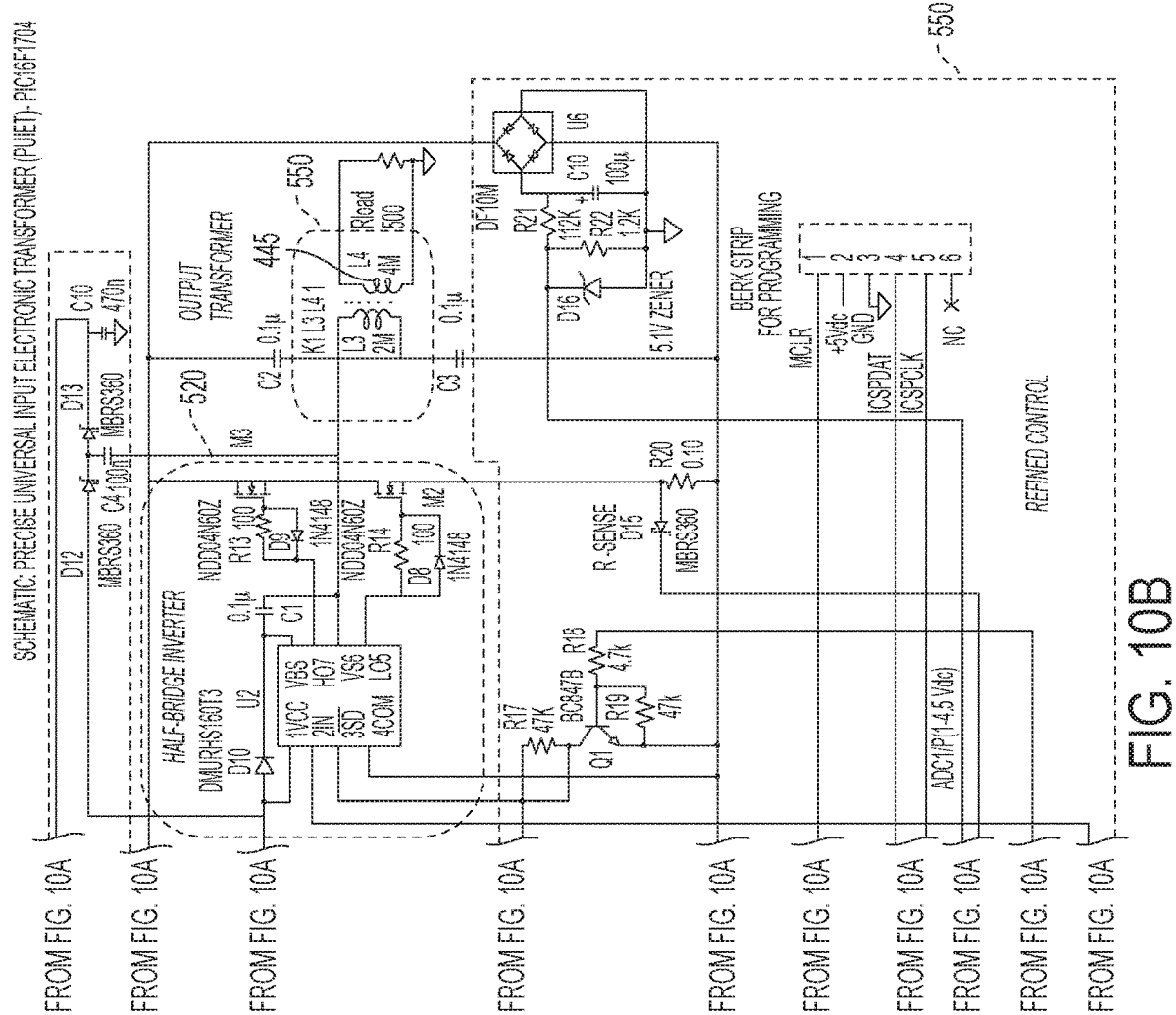

FIGS. 10A and 10B is a circuit diagram illustrating the DUIET 500. In the illustrated embodiment, the dimming control 530 includes a dimming input 535, an opto-isolator, or opto-coupler, U10, and a plurality of electrical and electronic components that provide operational control and protection to the components and modules of the dimming control 530. In the illustrated embodiment, the dimming control 530 is electrically connected to the other components of the DUIET 500, however, in other embodiments, the dimming control 530 may be wireless connected, or connected by any other analog and/or digital protocol known to one skilled in the art.

In operation, a user provides a user-input (e.g., approximately 0 VDC to approximately 10 VDC), in some embodiments via a current-sinking standard controller, at the dimming input 535 of the dimming control 530. The opto-isolator U10 outputs a DC level signal, based on the user-input, to the controller 550. For example, but not limited to, a user-input of a current-sinking 10 VDC will result in a PWM signal having a duty cycle of approximately of 90%, while a user-input of 1 VDC will result in a PWM signal having a duty cycle of approximately 10%. In some embodiments, the DUIET 500 can be adjusted to provide a 0% duty cycle for an approximately 0 VDC control to provide a dim-to-off feature. The controller 550 receives the PWM signal and outputs a control signal to the first inverter 520 based on the PWM signal. The control signal selectively controls the first inverter 520 to output a switched voltage relating to the user-input received by the dimming control 530.

The output transformer 540 receives the switched voltage and outputs an output voltage in a similar fashion as the embodiment of FIGS. 1 and 2. In some embodiments, the output transformer 540 is substantially similar to the output transformer 130 of the embodiment illustrated in FIGS. 1 and 2. The output voltage is then output via the output 545. The output voltage is substantially the same regardless of the input voltage; rather the output voltage varies based on the received user-input at the dimming control 530.

Figure 11:
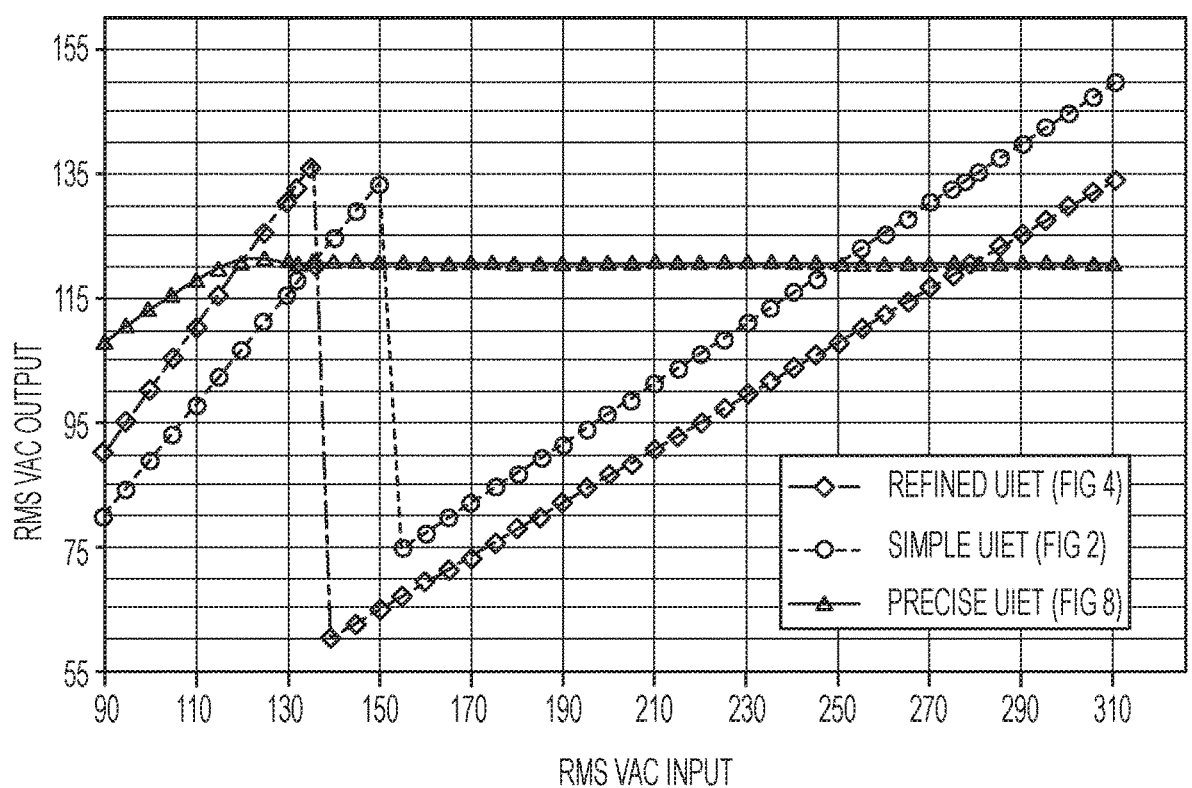
FIG. 11 is a chart illustrating input voltage verse output voltages of the universal input electronic transformers according to FIGS. 1, 3, and 7.

FIG. 11 is a chart illustrating and comparing the input voltage verse the output voltage of the SUIET 100 (FIGS. 1 and 2), the RUIET 200 (FIGS. 3 and 4), and the PUIET 400 (FIGS. 7 and 8). As illustrated, SUIET 100 outputs a voltage of approximately 75 VAC RMS to approximately 145 VAC RMS regardless when the input voltage is approximately 90 VAC RMS to approximately 310 VAC RMS. The RUIET 200 outputs a voltage of approximately 60 VAC RMS to approximately 135 VAC RMS when the input voltage is approximately 90 VAC RMS to approximately 310 VAC RMS. In some embodiments, the aRUIET 300 outputs substantially similar output voltages to the RUIET 200. The PUIET 400 outputs a voltage of approximately 110 VAC RMS to approximately 125 VAC RMS when the input voltage is approximately 90 VAC RMS to approximately 310 VAC RMS. All of the various embodiments discussed above can be adjusted at the output transformer, (e.g., 430 of the PUIET 400, 540 of the DUIET 500) to provide 24 VAC or 12 VAC outputs. The main advantage of the DUIET 500 and PUIET 400 over the SUIET 100, RUIET 200, and RUIET 300 is that the switched output does not exist within a 120 Hz, (twice the line frequency) envelope as in standard electronic transformers today; therefore, 120 Hz ripple usually transmitted on to the light source is eliminated.

Thus, the present application provides, among other things, a universal input electronic transformer operable to output a substantially constant voltage regardless of the amplitude of the received input voltage. Various features and advantages of the present application are set forth in the following claims.

What is claimed is:

1. An electronic transformer comprising:
   an input configured to receive an input voltage;
   a rectifier and a power factor corrector, the rectifier configured to rectify the input voltage and the power factor corrector configured to output a substantially constant DC voltage regardless of an amplitude of the input voltage;
   a dimming control circuit configured to receive a user-input and output a pulse width modulated signal based on the user-input;
   a controller configured to receive the substantially constant DC voltage and output a control voltage, the controller varying the control voltage based on the pulse width modulated signal;
   an inverter configured to receive the substantially constant DC voltage and the control voltage and output a switched voltage related to the pulse width modulated signal; and
   an output transformer configured to receive the switched voltage and provide an output voltage;
   wherein the output voltage is substantially the same regardless of an amplitude of an input voltage.

2. The electronic transformer of claim 1, wherein the inverter is a half-bridge inverter.

3. The electronic transformer of claim 1, wherein the amplitude is at least one selected from a group consisting of approximately 120-volts RMS and approximately 277-volts RMS.

4. The electronic transformer of claim 1, wherein the output voltage is within a range between approximately 100-volts and 140-volts.

5. The electronic transformer of claim 1, wherein the output transformer includes a primary coil and a secondary coil, the secondary coil having at least one selected from the group of a first number of turns and a second number of turns.

6. The electronic transformer of claim 5, wherein the number of turns of the secondary coil is based on the input voltage.

7. The electronic transformer of claim 1, further comprising a booster circuit configured to boost the input voltage.

8. A method of transforming an input voltage, the method comprising:
- receiving the input voltage;
- rectifying, via a rectifier, the input voltage;
- outputting, via a power factor corrector, a substantially constant DC voltage regardless of an amplitude of the input voltage;
- receiving a user-input with a dimming control circuit;
- outputting, with the dimming control circuit, a pulse width modulated signal based on the user-input;
- receiving, with a controller, the substantially constant DC voltage;
- outputting, with the controller, a control voltage based on the pulse width modulated signal;
- receiving, with an inverter, the substantially constant DC voltage and the control voltage;
- outputting, with the inverter, a switched voltage related to the pulse width modulated signal; and
- outputting, with an output transformer, an output voltage based on the switched voltage;
- wherein the output voltage is substantially the same regardless of an amplitude of the input voltage.

9. The method of claim 8, wherein the inverter is a half-bridge inverter.

10. The method of claim 8, wherein the amplitude is at least one selected from a group consisting of approximately 120-volts RMS and approximately 277-volts RMS.

11. The method of claim 8, wherein the output voltage is within a range between approximately 100-volts and 140-volts.

12. The method of claim 8, further comprising boosting the input voltage.

* * * * *